May 31, 1966  F. FREY ETAL  3,253,324
METHOD OF AND SYSTEM FOR WIRING ELECTRICAL CIRCUITS
Filed April 4, 1960  4 Sheets-Sheet 1

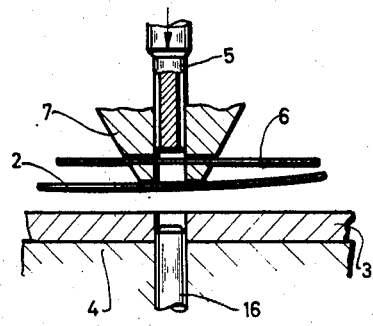
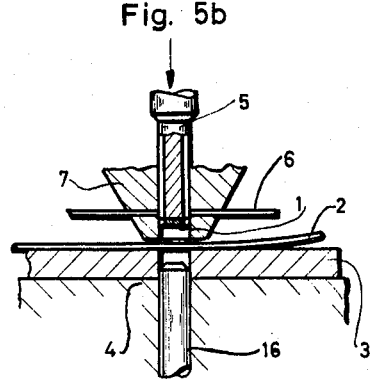
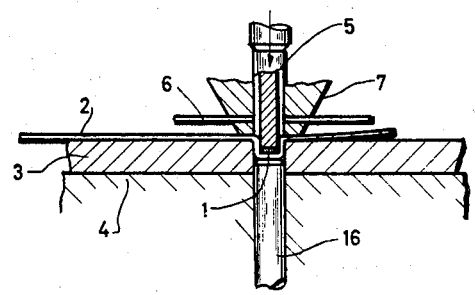
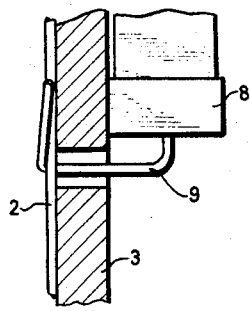
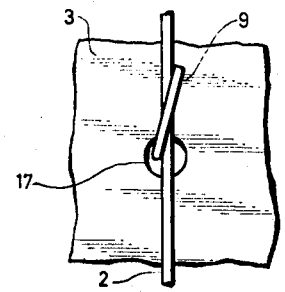

May 31, 1966  F. FREY ETAL  3,253,324
METHOD OF AND SYSTEM FOR WIRING ELECTRICAL CIRCUITS
Filed April 4, 1960  4 Sheets-Sheet 4
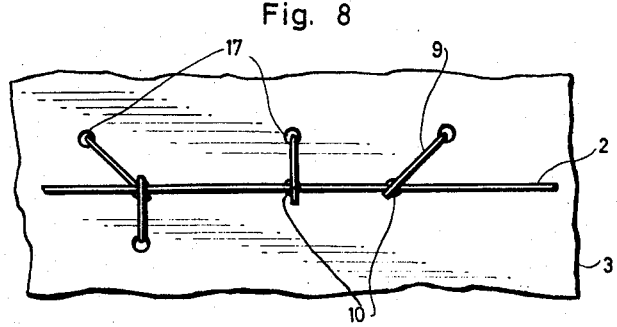
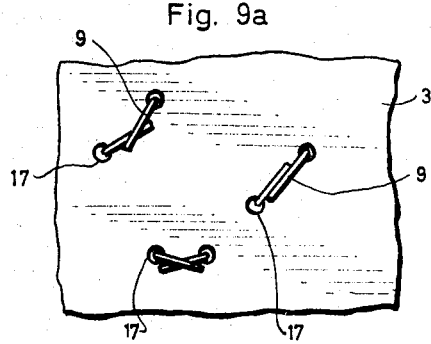
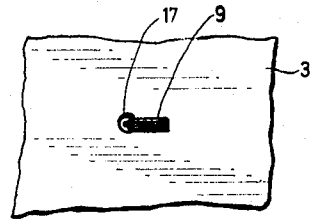
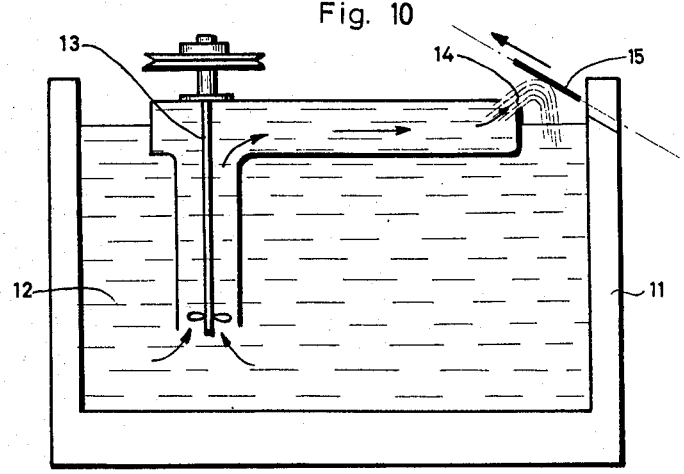

United States Patent Office

3,253,324
Patented May 31, 1966

3,253,324
METHOD OF AND SYSTEM FOR WIRING ELECTRICAL CIRCUITS
Friedrich Frey, Ludwig Holler, Willy Lohs, and Friedrich Sommer, Munich, and Freiwalt Schon, Gauting, near Munich, Germany, assignors to Siemens & Halske Aktiengesellschaft, Berlin and Munich, Germany, a corporation of Germany
Filed Apr. 4, 1960, Ser. No. 19,662
Claims priority, application Germany, Apr. 10, 1959, S 62,523
15 Claims. (Cl. 29—155.5)

This invention is concerned with a method of and system for wiring electrical circuits, especially circuits for electronic units used in communication systems.

Automation is being increasingly employed for producing electrical wirings. Printed circuits have become known in this connection; however, owing to great expenditures connected with expensive manufacturing devices, such printed circuits are economical only in cases requiring great numbers of units. The corresponding technique also introduces numerous problems concerning chemical processes requiring far reaching adjustments to be made in many manufacturing establishments.

In order to avoid these difficulties, it has been proposed to continue the use of the customary wires for producing wirings, but to guide them automatically over a carrier provided with anchoring points and to wind it about these anchoring points. The construction of the anchoring points is of basic importance for the wiring to be carried out in this manner. The simpler the fastening of the wire at the anchoring points is, the easier will it be to produce the entire wiring.

A method has become known in this connection, decribed in Germany Patent No. 735,364, according to which the wire is secured on a plate, serving as a carrier, by pressing it by means of a plunger into holes, thereby forcing the wire apart so that it enters along the sides of the holes somewhat into the plate material whereby the wire is held in the desired positions. In order to avoid lateral escape of the wire incident to this operation, the hole is provided with two lateral recesses into which are projected pins extending perpendicularly to the plates, such pins forming guides for the wire incident to the motion of the plunger. This method merely provides for securing the wire on the carrier without allowing for any mechanical stresses to be placed thereon, such as they occur, for example, in the case of wires with a diameter of less than 1 millimeter, customarily used in communication technique, due to structural elements soldered thereto. It must be considered in this connection that the wire, placed into the holes can be subjected only to slight squeezing and therefore can enter into the plate material only very slightly because it would otherwise be flattened too strongly and thus lose its necessary mechanical strength. Moreover, the insulating materials customarily used for the carrier plate, for example, hard paper, do not permit entry thereinto of the relatively soft wire which practically always consists of copper, that is, the wire will, responsive to a given squeezing operation, hug the wall of the hole without anchoring itself therein. Accordingly, this method of wire anchoring is unsuitable for wiring which is to be subjected to mechanical stresses as noted before.

The invention avoids these disadvantages. It is concerned with a method of producing wirings for electrical circuits, especially for use in communication apparatus, according to which a wire is carried over an insulating plate serving as a carrier. The method according to the invention provides for anchoring the wire at anchoring points so securely that the wire can subsequently be subjected to mechanical stresses such as they occur incident to the further processing of the resulting wiring and incident to manipulation thereof in practical use.

The characteristic features of the system and method of the invention reside in guiding a wire over a carrier having anchoring holes formed therein at desired points thereof, utilizing a clamping element overlying the wire at each anchoring hole, and pressing the corresponding clamping element, by means of a plunger, against the wire, thereby driving such clamping element and the corresponding wire portion into the hole and thus disposing the wire in the hole in tensioned or prestressed condition.

In carrying out the invention, the wire is not subjected to any stress leading to deformation that could deleteriously effect its strength, the anchoring in the respective holes being effected by the corresponding clamping elements. The fact that the anchoring points are formed by driving the respective clamping elements into the anchoring holes jointly with the corresponding wire portions, in one operation, is of particular importance. Wedge members or tubular rivets may for example be used as clamping elements.

A circular disc having along the margin thereof two oppositely disposed radially inwardly directed recesses formed therein, for receiving the wire to be anchored, was found particularly well suited as a clamping element, such disc being fitted into an anchoring hole with a press fit. Such disc exerts a clamping action and also holds the wire drawn therewith into a hole, under tension, thereby securing the mechanical strength and stability of the wiring and particularly the assured guiding of the wire in desired spacing from neighboring wires. Another advantage of the anchoring disc resides in the fact that it may be made very small, its size related to the diameter of the wire, thereby permitting construction of a small-mesh network of wires. A disc with a diameter of 1.5 millimeters suffices for the anchoring of wires with 0.4 millimeter diameter.

The various objects and features of the invention will be brought out in the course of the description of embodiments which will be rendered below with reference to the accompanying drawings. In the drawings, FIG. 1 shows on an enlarged scale an anchoring disc in elevational view with wire portions nestled within its recesses in cross section;

FIGS. 5a, 5b, 5c illustrate the method of pressing an anchoring disc jointly with a wire portion into an anchoring hole in a plate serving as a carrier;

FIG. 6 shows the arrangement of a structural element relative to a plate serving as a carrier;

FIG. 7 indicates the disposition of wires;

FIG. 8 shows crossing points of wires;

FIGS. 9a and 9b illustrate the manner of interconnecting wires of different structural elements; and FIG. 10 shows an example of carrying out the soldering.

Figure 1:
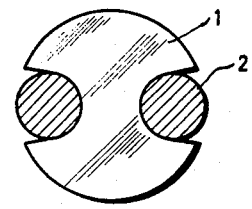

In FIG. 1, numeral 1 indicates the anchoring disc and numeral 2 indicates portions of wire nestling in the recesses of the disc.

Figure 2A:
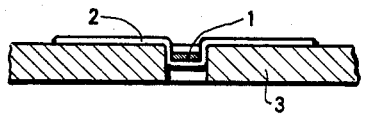
FIGS. 2, 2a and 3 illustrate the disposition of wires anchored in holes in a carrier.
Figure 2B:
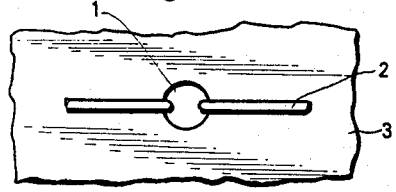

In FIGS. 2a and 2b, numeral 2 indicates a wire, numeral 3 a plate serving as a carrier, and numeral 1 the clamping disc which anchors the wire in a hole formed in the plate 3.

Figure 3:
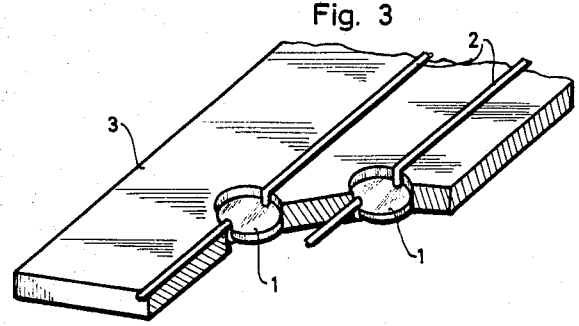

FIG. 3 shows a corresponding structure in perspective view. There are two wires disposed along one side of the plate 3 and each wire is fastened in a hole formed in the plate by means of a clamping or anchoring disc 1. The discs 1 are pressed into the plate 3, leaving sufficient plate material respectively above and below the anchoring discs so that the discs are securely held in position.

The spacing of the discs from the bottom side of the plate 3, as clearly shown in FIGS. 2 and 3, assures electrical separation from parts disposed therebelow.

The use of the circular wire anchoring discs facilitates and simplifies the forming of the anchoring holes which may be simply drilled or punched. Punched holes have slightly rounded or beveled rims at the end thereof facing the punch tool. Such bevel facilitates the operation of pressing the discs into the holes and prevents sharp nicks in the wire anchored in the holes by the respective discs.

Figure 4A:
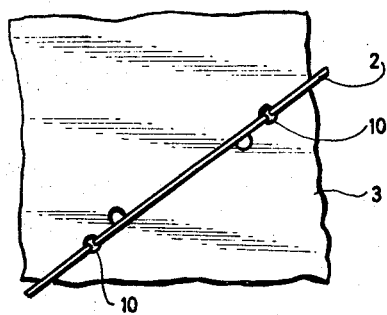
FIGS. 4a, 4b, 4c show how a wire may be disposed over a plate serving as a carrier.
Figure 4B:
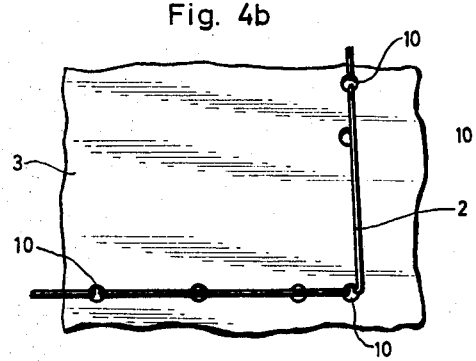
Figure 4C:
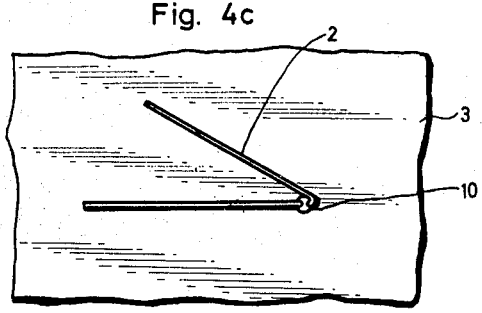

FIGS. 4a, 4b, 4c show examples of disposing wires along a plate serving as a carrier. The wire 2 in FIG. 4a extends straight across the plate 3 and is anchored thereto at points 10. The wire portion extending between the anchoring points 10 is tightly stretched owing to the drawing of parts thereof into the anchoring holes. Two further holes are formed in the carrier plate 3 for accommodating terminal conductors belonging to structural elements. FIGS. 4b and 4c illustrate differently disposed wires, namely, wires 2 extending at angles from respective anchoring points 10. It will be clear, therefore, that a wire can be carried over the plate 3 in any desired direction and extend from an anchoring point in any other direction.

FIGS. 5a, 5b and 5c show schematically the manner of pressing an anchoring disc jointly with a wire portion into an anchoring hole formed in a carrier plate. The plate 3 is placed on a support 4 with an anchoring hole formed therein disposed underneath a plunger or punch 5 serving for pressing the disc and wire into the anchoring hole. As is apparent from FIG. 5b, the disc 1 is first punched from a metal strip 6 in a shape corresponding to that shown in FIG. 1, the punching of the disc 1 being effected by the plunger 5. The plunger, in the further course of its stroke moves the disc into engagement with the wire 2. The plunger 5 and the disc 1 move thereby through the guide 7. Further motion of the plunger 5 moves the disc 1 and therewith the corresponding portion of the wire 2 into the anchoring hole in the plate 3, as illustrated in FIG. 5c, thus concluding the anchoring operation. Separately prepared discs may of course be used and the disc punching step preceding the anchoring step may in such case be omitted.

The outer diameter of the disc is related to the inner diameter of the anchoring holes so as to provide for a firm fit of the discs in the holes. Owing to a certain elasticity and plasticity of the discs and of the material of the carrier plate, the discs will be firmly seated in their positions.

The secure seating of the discs may be assured by exerting thereon a counter pressure after disposing them in the respective anchoring holes. It must be considered in this connection that the disc is incident to the pressure exerted thereon by the plunger slightly arched in the direction of the plunger motion. By pressing the arching back to the plane shape, the disc will expand radially, thereby increasing the seating force acting on the wall of the anchoring hole and reinforcing the firm seat. The restoration of the plane shape of the disc, cancelling the arching thereof, may be obtained by exerting on the disc a counter force when the disc reaches its terminal position in the anchoring hole.

The means for exerting the corresponding counter pressure is a pin 16, shown in FIGS. 5a, 5b, 5c which projects into the anchoring hole from the bottom thereof. This pin, aside from a slight bevel, has a straight end forming a stop for the disc and wire pressed into the hole, such stop acting to exert on the inserted disc in the terminal stroke position of the plunger 5 an upwardly directed counter force which presses the arched disc back to plane shape and thereby producing the radial expansion of the disc which acts to secure its seat in the anchoring hole as described before.

The rim of the disc may be deformed slightly upwardly during the pressing thereof into the corresponding anchoring hole. This can likewise be utilized for improving the firm seating of the disc, by imparting to the pin 16 a short upward stroke which is effective to exert a corresponding upward force on the disc which restores the rim to plane shape, thereby again effecting radial expansion of the disc to press its rim firmly in engagement with the wall of the anchoring hole.

The above described method or system steps for securing the firm seating of the anchoring discs utilize a particular property of the discs which becomes operative by virtue of the punching step executed prior to the anchoring step. The punching produces on the disc rim a bur extending along the edge facing the punch. The opposite edge is, due to the punching operation, slightly rounded. The shape of the disc accordingly facilitates the anchoring operation, that is, pressure insertion into the anchoring hole and favoring at the same time the reforming or corrective forming of the disc to cancel the arching thereof suffered during the pressure insertion.

The structural elements which are to be connected by the wiring thus produced may be provided as desired on both sides of the carrier plate. However, when employing an automatic soldering method, in the course of which numerous soldering points are to be produced in one continuous operation, the structural elements are advantageously disposed on the side of the carrier plate which faces away from the wiring, and the terminal conductors of such elements are projected through special holes formed in the plate, for disposal thereof along the other side in engagement with desired wires. The ends of the terminal conductors of the structural elements are thereby disposed at the wiring side at an angle and so short that the corresponding structural elements come to lie upon the plate, thus disposing the structural elements in self-carrying manner for the subsequent soldering operation.

FIG. 6 illustrates the above explained disposition of a structural element, showing a portion of anchored wire 2 extending along one side of the carrier plate 3. Upon the other side of the plate 3 is disposed a structural element 8, for example, a resistor, having a terminal conductor 9 extending angularly through a hole in the plate 3 to the other side thereof and into engagement with the anchored wire 2. The angular part of the conductor is as short as possible, whereby the structural element 8 is drawn to the plate 3 and thus sufficiently firmly fastened for the subsequent soldering operation.

The holes for extending the terminal conductors are preferably disposed substantially in alignment with the anchored wires and the terminal conductors are placed so that they cross the anchored wire at an acute angle. This is shown in FIG. 7. The anchored wire 2 extends above a hole 17 formed in the carrier plate 3, a terminal wire 9 extending through the hole and being bent at an angle so that it crosses the anchored wire 2 at an acute angle, in engagement therewith, thus providing for the subsequent soldering a relatively long and reliable soldering zone.

If the holes for the terminal conductors do not for some reason lie directly underneath the anchored wire, as shown, for example, in FIGS. 4a and 4b, the terminal conductors will be carried to the anchored wire at another angle as illustrated, for example, in FIG. 8. Several terminal conductors 9 extending from holes 17 are carried to the anchored wire 2, resulting in crossing points forming relatively short soldering zones. These soldering zones are therefore advantageously disposed at anchoring points 10 of the wire 2 to obtain at the soldering points large accumulation of solder and thus soldering points of increased size.

The wiring system or method according to the invention, utilizing a plate as a carrier, also permits to provide direct electrical connections between structural elements disposed upon the plate. FIG. 9a shows how the terminal conductors 9 of different structural elements can be interconnected on the side of the plate facing away from the structural elements, without establishing connection with an anchored wire. Each terminal conductor projects thereby through a hole 17 provided therefor. FIG. 9b illustrates the possibility of projecting a plurality of terminal conductors 9 through a single hole 17 for the purpose of subsequently soldering these conductors together.

As indicated before, the placement of structural elements upon one side of the carrier plate and the placement of the anchored wires upon the other plate side, permits to carry out the soldering of all terminal points of an entire plate, in one operation. Suitable for this purpose is for example the so-called immersion soldering in which the plate is carried flat to a tin bath until the anchored wires with the terminal conductors of the structural elements dip into the tin bath. Another advantageous method for the automatic soldering resides in the so-called surge-soldering in which a tin surge is produced extending in waterfall manner over the width of the carrier plate and moving the plate relative thereto with the wiring side thereof facing the tin surge.

FIG. 10 illustrates in schematic manner how the surge-soldering may be applied. There is provided a receptacle 11 containing liquid tin 12, conveyor means, in the illustrated case a propeller-like member driven by a shaft 13 raising liquid tin and forcing it by way of a channel to a discharge nozzle 14, such nozzle extending rectilinearly over a width exceeding that of the carrier plates to be processed. The liquid tin leaves the nozzle in a surge along an upwardly curving path thus permitting moving a plate 15 with the wiring side thereof against the tin surge to wet all connections accordingly. The advantages of this method reside first in that oxide skin possibly forming in the process will be continuously brushed off from the tin by the action of the nozzle and, second, in obtaining a wetting of the individual connecting points without formation of bubbles.

Changes may be made within the scope and spirit of the appended claims which define what is believed to be new and desired to have protected by Letters Patent.

We claim:

1. A method of locating and anchoring circuit wires upon an insulating plate which also serves as a carrier for circuit components which are to be interconnected by the wires, holes being formed in said insulating plate forming anchoring points for said wires, comprising drawing wires over the plate in overlying relationship with respect to the holes, placing a clamping element on said wire at a point in alignment with an anchoring hole, and driving said clamping element by means of a punch into the corresponding hole, whereby a portion of said circuit wire is drawn into such hole under tension and anchored therein.

2. A method according to claim 1, wherein said clamping element draws said wire portion into said hole to position it with the bottom part thereof spaced inwardly from the plane of the other side of said carrier plate.

3. A method according to claim 2, wherein said clamping element is a circular disc having two oppositely disposed marginal radially inwardly directed recesses formed therein for accommodating portions of said circuit wire to be drawn into said anchoring hole, said disc fitting tightly into said hole.

4. A method according to claim 2, wherein said clamping element is a circular disc having two oppositely disposed marginal radially inwardly directed recesses formed therein for accommodating portions of said circuit wire to be drawn into said anchoring hole, said disc fitting tightly into said hole and being positioned therein with its opposite sides inwardly recessed with respect to the planes of the corresponding sides of said carrier plate.

5. A method according to claim 4, wherein said clamping disc, which is originally of plane configuration, is deformed to assume an arched shape incident to being driven into said anchoring hole by said punch, comprising the step of exerting on said disc in the terminal position thereof a pressure which is operative counter to the pressure exerted by said punch so as to restore said disc to a plane shape, whereby the material of said disc is expanded radially to increase the force which anchors the disc in engagement with the wall of the corresponding anchoring hole.

6. A method according to claim 4, comprising the step of punching the clamping disc by said punch from a metal strip prior to driving it by such punch into said anchoring hole together with the portion of the circuit wire to be anchored therein.

7. A method according to claim 4, comprising arranging structural elements on the side of said carrier plate which faces away from the side carrying said anchored circuit wire, and extending the terminal conductors of said structural elements angularly through further holes formed in said carrier plate to the side carrying said anchored circuit wire into engagement with said anchored wire.

8. A method according to claim 7, wherein said circuit wire overlies said further holes, comprising placing said terminal wires of said structural elements in engagement with said circuit wire at an acute angle relative thereto.

9. A method according to claim 7, wherein the angularly extending terminal conductors of said structural elements are so short that they are operative to hold the corresponding structural elements in position substantially in engagement with the surface of the carrier plate.

10. A method according to claim 9, comprising the step of effecting the soldering of all points of connections at the side of the carrier plate to which said circuit wire is anchored by immersion soldering.

11. A method according to claim 9, comprising the step of effecting the soldering of all points of connections at the side of the carrier plate to which said circuit wire is anchored by surge soldering.

12. A method of making a wired circuit, comprising punching from a metal strip a generally circular disc having on the margin thereof oppositely disposed radially inwardly directed recesses, thereafter directly and immediately driving said disc against a circuit wire into a hole formed in an insulating plate, portions of said wire thereby entering said recesses in said disc and being driven into said hole together with said disc, said disc being thereby press-fitted in such hole and holding the corresponding circuit wire portion anchored therein.

13. A method according to claim 12, wherein said disc is press-fitted in said anchoring hole with the opposite sides thereof recessed inwardly from the planes of the corresponding sides of said plate.

14. A method of making a wired circuit, comprising punching from a metal strip a generally circular disc having on the margin thereof oppositely disposed radially inwardly directed recesses, thereafter directly and immediately driving said disc against a circuit wire into a hole formed in an insulating plate, portions of said wire thereby entering said recesses in said disc and being driven into said hole together with said disc, said disc being thereby press-fitted in such hole and holding the corresponding circuit wire portion anchored therein, the bottom part of the corresponding portion of said circuit wire being thereby disposed inwardly recessed from the plane of the corresponding side of said plate.

15. A method according to claim 14, comprising disposing structural elements on the other side of said plate, and extending the terminal conductors of said structural elements angularly through further holes formed in said plate for engagement with the circuit wire anchored on said plate.

References Cited by the Examiner
UNITED STATES PATENTS

| | | | |
|---|---|---|---|
| 2,864,156 | 12/1958 | Cardy | 29—155.5 |
| 2,918,287 | 12/1959 | Rosenblum | 317—101 |
| 2,945,162 | 7/1960 | Flour | 317—101 |
| 2,958,926 | 11/1960 | Morison | 29—155.5 |
| 3,038,105 | 6/1962 | Brownfield | 317—101 |
| 3,069,599 | 12/1962 | Schon | 317—101 |
| 3,092,759 | 6/1963 | Sommer | 317—101 |

JOHN F. CAMPBELL, *Primary Examiner.*

S. BERNSTEIN, J. D. KALLAM, J. G. COBB, J. W. BOCK, *Examiners.*